F. W. WEEKS.
CINEMATOGRAPH TARGET APPARATUS.
APPLICATION FILED NOV. 26, 1915.
1,197,568.
Patented Sept. 5, 1916.
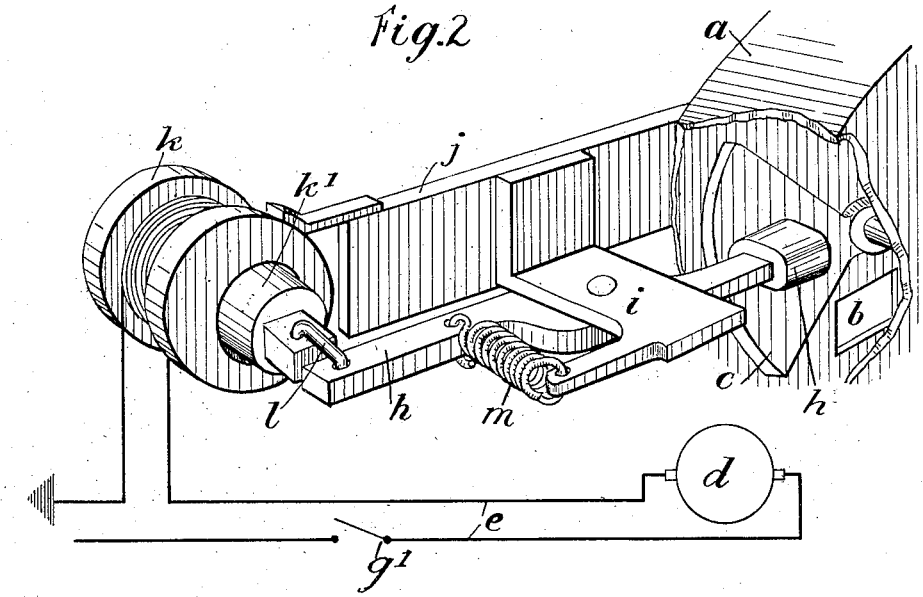
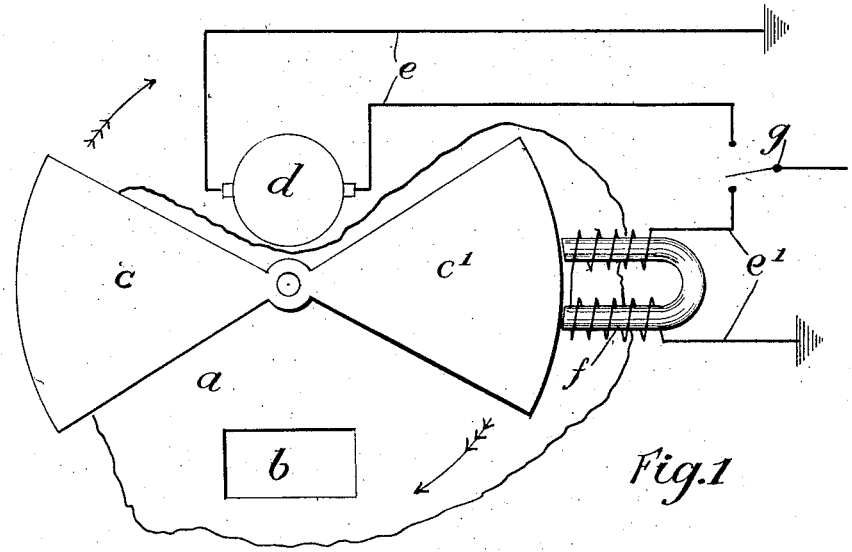
Frank W. Weeks, Inventor

UNITED STATES PATENT OFFICE.

FRANK W. WEEKS, OF NEW YORK, N. Y., ASSIGNOR TO LYDIA B. KOCH, OF NEW YORK, N. Y.

CINEMATOGRAPH TARGET APPARATUS.

1,197,568.

Specification of Letters Patent.   Patented Sept. 5, 1916.

Application filed November 26, 1915.   Serial No. 63,418.

*To all whom it may concern:*

Be it known that I, FRANK W. WEEKS, a citizen of the United States, residing at the borough of Manhattan, city, county, and State of New York, have invented certain new and useful Improvements in Cinematograph Target Apparatus, of which the following is a specification, reference being had therein to the accompanying drawings, which form a part thereof.

My invention relates to cinematograph target apparatus and more particularly to the projector used in apparatus of this character.

In ordinary projectors or moving picture machines, a rotary shutter having substantially diametrically opposite sectors is employed, these sectors passing the sight opening successively in a manner and at a speed to insure the desired optical effects of the image directed upon the screen. In this ordinary type of machine, the film is run continuously through the machine, and no provision is made, or required, for the stoppage of the film to change a moving image to a still image. When projectors are used in target apparatus however, it is necessary to stop the projector substantially simultaneously with the impact of a bullet with the screen, to determine the accuracy of the fire of the marksman. The stoppage of the projector is for the purpose of changing the image projected upon the screen from a moving image to a still image; and to secure the desired result, it is essential to provide means whereby upon the stoppage of the projector, the movement of the shutter will be arrested while said shutter is in the wide open position. In this type of projector, it is also desirable to run the film through the machine by means of a motor driven mechanism, the controlling means for this motor acting in synchronism with the governor controlling the shutter action.

By means of my invention, I am enabled to produce a projector adapted to be intermittently stopped to change the image directed upon the screen from a moving to a still image, the shutter of which projector when the film is in motion, will have the same freedom of action and operative effect, as the shutter of the ordinary projector, but which upon the stoppage of the film, will come to rest, substantially simultaneously with the film, and always in the open position. This shutter governor is operatively connected with the film driving mechanism, so that when this latter mechanism is operative, the governor is inoperative, but immediately upon said driving mechanism becoming inoperative said governor becomes operative, both of said mechanisms being controlled by the same agencies. Preferably both the film driving mechanism and said governor are electrically operated.

Another object of my invention is to preserve simplicity in the projector shutter mechanism as well as in the governor mechanism therefor, and thus minimize likelihood of the apparatus getting out of order, or of interference with the projection of the image upon the film.

The invention consists primarily in a cinematograph target apparatus embodying therein a projector having a sight opening and including therein a rotary shutter having divergently projecting sectors adapted to be passed across the said opening, means rotating said shutter simultaneously with the feeding of a film across said opening and a normally inoperative brake mechanism adapted to arrest the rotary movement of said shutter when in the open position and means whereby said brake mechanism is made operative substantially simultaneously with the stoppage of said film; and in such other novel features of construction and combination of parts as are hereinafter set forth and described, and more particularly pointed out in the claims hereto appended.

Referring to the accompanying drawings: Figure 1 is an elevation of a shutter mechanism showing the preferred form of braking mechanism, and Fig. 2 is a perspective view of said shutter mechanism, showing a modified form of said braking mechanism.

Like letters refer to like parts in both of said views.

In the two forms of the invention shown, it will be observed that the shutter governor in each construction is electrically controlled and that while the force employed to arrest movement of the shutter in one of these forms differs from that of the other, the application of this force is directly upon the shutter when the shutter is in a given position so that as it comes to rest, the sight opening will always be open to the full extent.

In the embodiment of my invention shown in the accompanying drawings, $a$ indicates the shutter support of a projector having therein a sight opening $b$. Rotatably mounted in relation to said support is a rotary shutter having substantially diametrically opposite sectors $c$—$c'$ adapted to successively cut across the sight opening in a manner to interrupt the projection of the light rays therethrough to secure the desired optical effect of the image directed against the screen. This shutter is ordinarily made of sheet steel. The film in said projector is passed through the machine in the ordinary manner, the feeding mechanism being actuated by means of a motor, shown conventionally at $d$ included in the circuit $e$.

In the preferred form of the invention, I mount adjacent the path of the outer edge of the shutter an electro-magnet $f$ arranged in a branch $e'$ of the circuit $e$, said circuit having arranged therein a two point switch $g$, by means of which the circuit to said magnet $f$ will be closed substantially simultaneously with the opening of the circuit to the motor $d$ and opened substantially simultaneously with the closing of said circuit. This switch $g$ may be actuated in any desired manner, as by the mechanism described and claimed in my application for Letters Patent upon cinematograph target apparatus filed Nov. 26, 1915 Serial No. 63,417. The poles of the magnet $f$ may take any desired form to insure the development of sufficient traction, and its application to the shutter in a manner to quickly arrest movement thereof, the showing of this magnet in the accompanying drawings being merely the conventional form of an ordinary horseshoe magnet. It will be observed that the controlling switch is so arranged as to secure the desired synchronism in the stoppage of the motor $d$ and the energizing of the magnet $f$ to arrest movement of the shutter.

In the modification shown in Fig. 2, I employ in lieu of the magnetic brake consisting of the magnet $f$, an oscillatory brake arm $h$ having a friction brake head $h'$ adapted to operatively engage the surface of either sector $c$—$c'$ of the shutter. The brake arm $h$ is pivotally mounted upon an angular extension $i$ carried by a bracket $j$ mounted upon the shutter support $a$. Also carried by the bracket $j$ is a magnet $k$ preferably in the form of a solenoid, having a core $k'$ operatively connected by means of the link $l$ with one arm of the brake arm $h$. Said magnet is included in the circuit $e$, which circuit has therein a switch $g'$ adapted to simultaneously control the circuit to the motor $d$ and to the said magnet $k$. The brake head $h'$ is normally held out of the operative position with relation to the shutter by means of the magnet $k$, the oscillation of said arm under the control of said magnet tensioning the spring $m$ so that when the circuit $e$ is closed the spring $m$ will be tensioned and the interruption of this circuit will permit said spring to actuate the brake arm in a manner to bring the head $h'$ within the operative range of the shutter sector $c$ or $c'$. The head $h'$ is so formed as to insure the desired engagement between it and the shutter sector, as said sector comes within operative range of said head.

The switch mechanism $g'$ is adapted to be actuated in any desired manner, as by the automatic circuit controlling means shown and described in my aforesaid application for Letters Patent.

The operation of the herein described mechanism is substantially as follows:—In the preferred form of the invention when the projector is in operation, the switch $g$ will be so set as to close the circuit $e$, thus causing the film feeding mechanism and the rotary shutter to act in synchronism. When it is desired to stop the projector to change the moving image to a still image, the switch $g$ will be actuated to interrupt the circuit $e$ and at the same time close the circuit $e'$. Ordinarily this movement of the switch will occur substantially simultaneously with the impact of a bullet with the screen against which the light rays are directed by the projector. Since the object of this stoppage is to have the image upon the screen remain in substantially the same position as when the bullet impacted therewith, it is essential that this stoppage be quick so as to avoid any substantial variance in the position of the image upon the screen between the impact of the bullet therewith and the stoppage of the projector. With the actuation of the switch $g$ to open the circuit $e$ a continued movement of said switch results in the closing of the circuit $e'$, thus energizing the magnet $f$ so as to create a magnetic field through which the sectors $c$—$c'$ of the shutter must pass. The traction of the magnet is such as to be capable of arresting rotary movement of the shutter, although before this result is accomplished, it is possible that the shutter may make one or two rotations. This, however, will not be sufficient to materially vary the position of the image upon the screen. The magnet $f$ being positioned at one side of, and above, the sight opening, this opening will always be in the wide opening position when the shutter is arrested. When it is desired to again change the image from a stationary image to a moving image, the actuation of the switch *g* in the reverse position will open the circuit *e'* and close the circuit *e* thus deënergizing the magnet and energizing the motor so as to make the magnetic brake inoperative and permit the free rotation of said shutter.

In the form of the invention shown in Fig. 2, when the circuit *e* to the motor *d* is closed by the switch *g'*, the circuit to the magnet *k* will also be closed, the core of this magnet oscillating the brake arm *h* to an extent to hold the friction brake head *h'* thereof out of operative rotation to the shutter. This movement of the arm *h* will tension the spring *m*, this spring being held in tension so long as the said magnet is energized. Upon the stoppage of the motor *d*, through the opening of the circuit *e* by means of the switch *g'*, the said motor and also the magnet *k* will be simultaneously deënergized permitting the spring *m* to project the brake head *h'* into the operative relation to the shutter so that upon subsequent rotation of said shutter it will frictionally engage said brake head and be brought to rest in a position which will leave the sight opening *b* in the wide open position, as in the preferred form of the invention. When starting the projector, the switch *g'* is closed thus energizing the motor *d* and the magnet *k*, actuating the film feeding mechanism and permitting a free path of rotation for the shutter.

In the form of the invention shown in Fig. 2 the friction braking mechanism is positioned above and to one side of the sight opening in substantially the same relation as the magnet *f* in the preferred form of the invention, and with the same operative effect.

It will be observed that with both forms of the invention the portions of the projector instrumental in projecting the light rays upon the screen, remain the same as in the ordinary projector, so that the application thereto of the braking mechanism herein referred to, cannot in any way interfere with the operative effect of the projector in directing light rays upon the screen. The only effect of this mechanism is to insure the timely stoppage of the shutter in a position which will insure the sight opening being in the wide open position as the projector is stopped.

While I have herein described my invention in connection with cinematograph target apparatus, it is not my intention to limit its use to this particular type of apparatus, as it is apparent that under any condition where it is desirable to intermittently stop the movement of a film in a projector for the purpose of changing the moving image to a still image my invention may be advantageously used.

It is not my intention to limit my invention to the precise details of construction shown in the accompanying drawings, nor to the particular type of shutter shown therein it being apparent that both of these characteristics may be varied without departing from the spirit and scope of the invention.

Having described the invention, what I claim as new and desire to have protected by Letters Patent is:—

1. A cinematograph target apparatus embodying therein a projector having a sight opening and including therein a rotary shutter having divergently projected sectors adapted to be passed across the said opening, means rotating said shutter simultaneously with the feeding of a film across said opening, a normally inoperative brake mechanism positioned adjacent said shutter and adapted to act directly upon and arrest the rotary movement of said shutter and hold it in the open position, and means whereby said brake mechanism is made operative substantially simultaneously with the stoppage of the film.

2. A cinematograph target apparatus embodying therein a projector having a sight opening, and including therein a movable shutter adapted to be passed across said opening, an electric motor adapted to simultaneously actuate said shutter and feed a film across said opening, and a normally inoperative and electrically controlled brake mechanism adapted to arrest movement of said shutter when in the open position, and means adapted to simultaneously control the current for said motor and said brake mechanism whereby said brake mechanism is made operative substantially simultaneously with the stoppage of said motor, and is made inoperative substantially simultaneously with the starting of said motor.

3. A cinematograph target apparatus embodying therein a projector having a sight opening and including therein a movable shutter adapted to be passed across said opening, an electric motor adapted to simultaneously actuate said shutter and feed a film across said opening and a normally divergent electro-magnet positioned above, and at one side, of said sight opening, and adjacent the path of movement of said shutter, whereby movement of said shutter may be arrested while in the open position, and an electrical switch whereby when said motor is deënergized, said magnet will be substantially simultaneously energized and when said motor is energized said magnet is substantially simultaneously deënergized.

4. A cinematograph target apparatus embodying therein a projector having a sight opening and including therein a rotary shutter having substantially diametrically opposite sectors adapted to be passed across said opening, an electric motor adapted to simultaneously rotate said shutter, and feed a film across said opening, and a normally deënergized electromagnet positioned above and at one side of said opening adjacent the path of travel of the edge of said sector whereby the rotation of said shutter may be arrested while said shutter is in the open position and an electric switch whereby when said motor is deënergized, said magnet will be substantially simultaneously energized and when said motor is energized said magnet is substantially simultaneously deënergized.

In witness whereof, I have hereunto affixed my signature in the presence of two subscribing witnesses, this 20th day of November, 1915.

FRANK W. WEEKS.

Witnesses:
F. T. WENTWORTH,
JUDITH PARDEE.